United States Patent [19]

Pavone et al.

[11] 3,772,949
[45] Nov. 20, 1973

[54] METHOD AND APPARATUS FOR CUTTING SHEET MATERIAL

[75] Inventors: Robert J. Pavone, Wapping; Leonard R. Landers, South Windsor, both of Conn.

[73] Assignee: The Gerber Scientific Instrument Company, South Windsor, Conn.

[22] Filed: Jan. 17, 1972

[21] Appl. No.: 218,133

[52] U.S. Cl............... 83/56, 83/71, 83/471.2, 83/483, 83/561, 83/925 CC
[51] Int. Cl............................................. B26f 1/38
[58] Field of Search............ 83/483, 12, 8, 925 CC, 83/471.2, 477.1, 56, 71, 561

[56] References Cited
UNITED STATES PATENTS

| | | | |
|---|---|---|---|
| 3,522,753 | 8/1970 | Schmied | 83/483 X |
| 3,537,345 | 11/1970 | Luppino | 83/12 |
| 3,673,900 | 7/1972 | Jendrisak | 83/12 X |

*Primary Examiner*—J. M. Meister
*Attorney*—John C. Linderman

[57] ABSTRACT

A method and apparatus for cutting pattern pieces from an anisotropic sheet material having different cutting characteristics along different principal directions utilize a small cutting wheel that is guided along the periphery of a pattern piece to be cut by means of a digital control computer. The computer derives command signals from a stored cutting program and applies the signals to drive motors within a tool carriage to cause the cutting wheel to move along the periphery of the pattern piece. A load control mechanism is utilized to support the cutting wheel from the tool carriage and to vary the force with which the wheel is urged or pressed into cutting contact with the sheet material. When the wheel moves in cutting engagement with the material in a direction that offers increased resistance to cutting, the load control mechanism presses the cutting wheel more firmly against the material and when the wheel moves in a direction of reduced cutting resistance, the load control mechanism partially unloads the wheel to prevent cutting or increased wear of the work surface on which the sheet material is supported.

25 Claims, 6 Drawing Figures

METHOD AND APPARATUS FOR CUTTING SHEET MATERIAL

BACKGROUND OF THE INVENTION

The present invention relates to a method and apparatus for cutting sheet material in an automated cutting system. More particularly, the invention is concerned with cutting anisotropic sheet materials such as fibrous composite tapes which have widely divergent strengths and cutting characteristics along different principal axes of the material.

The concept of utilizing an automatically controlled cutting tool for cutting pattern pieces from a sheet of material is already well known in the art. U.S. Pat. No. 3,477,322 entitled "Device for Cutting Sheet Material" issued Nov. 11, 1969 to the assignee of the present invention discloses a cutting system in which a control computer guides a cutting tool over the work surface of a cutting table on which sheet material is held in a spread condition. The movements of the cutting tool are controlled so that the tool moves around the periphery of one or more pattern pieces in the cutting operation.

It is also known that the cutting tool in automated cutting systems of the type disclosed in the above-referenced patent can be formed as a small cutting wheel or disc having a diameter that is large enough to permit the wheel to cut through the sheet material during the cutting operation. U.S. Pat. application Ser. No. 119,151 filed Feb. 26, 1971 entitled "Method and Apparatus For Cutting Sheet Material" and assigned to Gerber Garment Technology, Inc. discloses a rotatably driven cutting wheel which, under the control of a computer or similar apparatus, translates through a sheet of material spread on a work table to perform a cutting operation in a manner generally similar to the apparatus of the present invention.

While many sheet materials are isotropic and have generally uniform cutting properties throughout, anisotropic sheet materials having different strength characteristics or different resistances to cutting along different axes can pose peculiar cutting problems, particularly where the differences in the cutting characteristics along the principal axes are extreme. When a pattern piece in a sheet of anisotropic material is circumscribed by the cutting tool, the tool may encounter each of the extremes in cutting resistance. For example, composite materials such as boron fiber sheet or tape produced by applying a boron coating to a very fine tungsten wire 0.0005 inch in diameter and binding a plurality of the fibers having a 0.008 inch diameter in closely packed relationship on a planar base or backing such as aluminum foil are known to have exceptional tensil and beinding strength characteristics associated with the principal axis aligned with the fibers. The resistance to cutting such tapes in a direction transverse to the fibers requires substantially greater cutting forces than required when cutting the material in a direction parallel to the fibers.

In carrying out such cutting operations in automatically controlled cutting systems the sheet material is usually spread on the resilient work surface of a cutting table and the table and cutting tool are moved relative to one another while the tool is held in cutting engagement with the material. If the cutting tool is held in engagement with fibrous sheet material at a relatively uniform detrusion force, that is a force normal to the plane of the sheet material, the tool can cause extensive damage to the work surface of the cutting table as a pattern piece is circumscribed. As the tool traverses a line of cut normal to the fibers, large detrusion forces may be required to cause the cutting tool to penetrate and completely sever the fibers and the backing; however, the same detrusion forces can cause the cutting tool to penetrate too deeply through the sheet material and into the work surface of the cutting table as the tool traverses a line of cut generally parallel to the fibers due to the reduced cutting resistance and reduceed deflections of the bed which defines the work surface of the cutting table on which the sheet material is supported during the cutting operation. Resilient beds on the work tables are generally desirable since they allow a tool to penetrate through the sheet material by a limited amount without damaging the work surface; however such beds permit greater deflections of the work surface and increase the difficulty of cutting anisotropic materials. It will be readily understood that where the sheet material possesses widely divergent strength characteristics in different coordinate directions, it may be impossible to select a single detrusion force that would permit the cutting tool to completely penetrate the sheet material at all points along the periphery of the pattern piece to be cut without damaging the work surface.

Accordingly, it is a general object of the present invention to disclose a method and apparatus for cutting sheet materials having different strength characteristics in different directions, by means of an automatically controlled cutting tool which is urged into cutting engagement with material by a controlled detrusion force.

SUMMARY OF THE INVENTION

The present invention resides in a method and apparatus for cutting pattern pieces from anisotropic sheet material which has different resistances to the cutting operation along the different lines of cut through the material. The apparatus which operates in accordance with the method of the present invention comprises support means defining a work surface for holding the sheet material fixedly in a spread condition as the material is moved relative to the cutting tool in the cutting operation. Carriage means are interposed between the support means and the cutting tool to move the sheet material and the tool relative to one another along a programmed line of cut at the periphery of a pattern piece desired from the sheet material. Movement control means are connected to the carriage means for controlling the relative movement of the tool and the support means on which the sheet material is spread. Load control means connected to the carriage means are utilized to regulate the force with which the cutting tool is held in cutting engagement with the material at the various points along the periphery of the pattern pieces. To correlate the loads applied through the load control means during the cutting operation with the material characteristics, the sheet material is oriented on the work surface with respect to a given reference direction in accordance with the anisotropic characteristics of the sheet material. The load control means then regulates the detrusion force of the tool in response to the direction of cut produced by the movement control means.

DESCRIPTION OF THE PREFERRED EMBODIMENTS

Figures 1, 2:
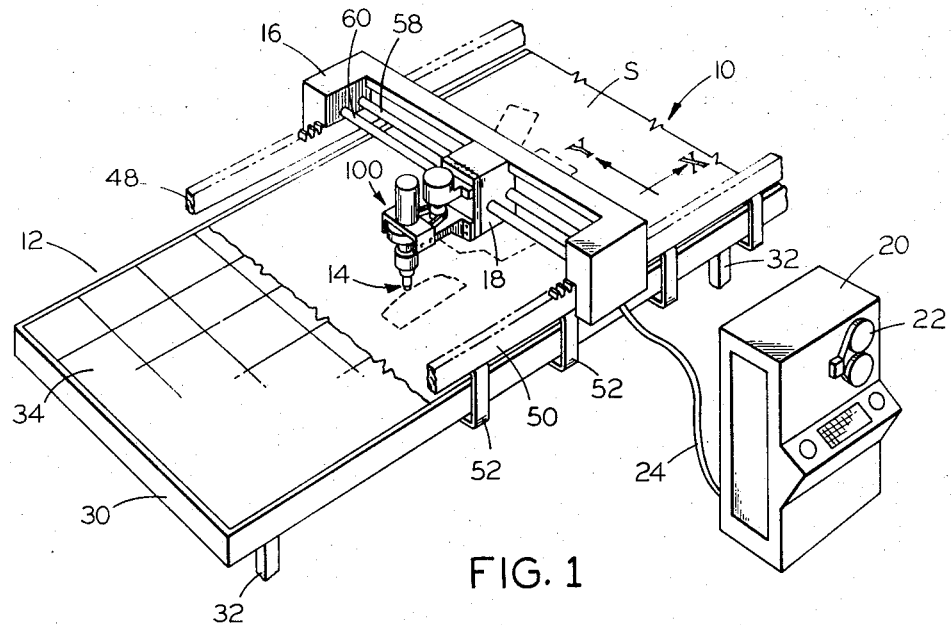
FIG. 1 is a perspective view of a cutting apparatus embodying the present invention.
FIG. 2 is a side elevation view of the cutting tool and cutting table in FIG. 1 and shows the load control mechanism connected to the tool.
Figure 3:
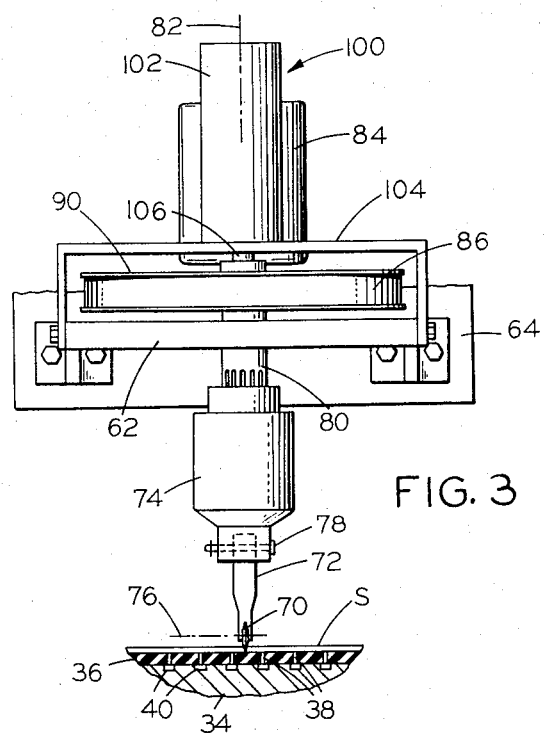
FIG. 3 is a front elevation view of the apparatus shown in FIG. 2.

FIGS. 1, 2 and 3 show an automated cutting system for cutting anisotropic sheet material in accordance with the present invention. The system, generally designated 10, is comprised of a cutting table 12, a cutting tool 14 and a tool carriage composed of an X carriage 16 which moves over the cutting table 12 in the indicated X direction and Y carriage 18 which is mounted to the X carriage and moves relative to the table 12 and the X carriage 16 in the indicated Y direction and a control computer 20 connected to the carriages and the tool for controlling the motions and operation of the tool during the cutting operation. The control computer 20 derives program information from a memory tape 22 and develops cutting control signals in accordance with the information. The control signals are transmitted through a command cable 24 to the two carriages 16 and 18 to cause the tool 14 to be translated over the table 12 in cutting engagement with a sheet material S from which pattern pieces defined by the tape program and shown by dotted lines are to be cut.

The sheet material S with which the present invention is concenred is an anisotropic material having different cutting characteristics along the illustrated X and Y coordinate directions of the table. An example of such material would be a boron fiber sheet or tape in which the fibers are arranged in parallel, closely packed relationship and secured to a backing material such as aluminum foil as described above. Anisotropic material such as the boron fiber tape having distinct directional strength characteristics are frequently used to form laminated articles and, by orienting the principal axes of the tape in adjacent laminations in different but selected directions, it is possible to build up a composite structure with preselected strength and bending characteristics. The pattern pieces such as those illustrated in FIG. 1 which are to be cut from the sheet material are, therefore, laid out in accordance with the directional characteristics of the material and the memory tape 22 is programmed accordingly.

The cutting table 12 has a frame 30 which rests on a plurality of table legs 32 and a bed 34 defining the work surface on which the sheet material S is spread. The exposed portion of the bed 34 defining the work surface is preferably composed of a resilient material such as a thick cover 36 of rubber (FIGS. 2 and 3) or similar material which is sufficiently resilient to allow the cutting tool 14 to be pressed through the sheet material S and partially into the cover 36 without cutting or otherwise damaging the work surface. In addition, the cover 36 is provided with a plurality of small openings 38 distributed over the entire extent of the work surface which openings communicate through channels 40 in the base of the bed 34 with a vacuum pump (not shown) so that when the sheet S is spread on the work surface it is held fixedly in position due to the subatmospheric pressure generated at the work surface by the vacuum pump.

The X carriage 16 is supported above the cutting table 12 on a pair of racks 48 and 50 which extend longitudinally along the edge of the table in the X direction and are held by brackets 52 projecting upwardly from the frame 30. Drive motors and pinions (not shown) within the carriage 16 engage the teeth of the racks 48 and 50 to drive the carriage 16 and the tool 14 back and forth over the table in the X direction in accordance with the movement commands transmitted from the computer 20.

The Y carriage 18 is suspended from the X carriage 16 by means of a guide rail 58 and a lead screw 60 that extend in the Y direction between the lateral ends of the X carriage 16. The lead screw 60 is rotated by another drive motor (not shown) controlled from the computer 20 and threadably engages the Y carriage 18 to position the carriage and tool 14 in the Y direction over the table. Composite motions of the X and Y carriages 16 and 18 permit the tool 14 to be translated in any given direction over the work surface of the cutting table 12 in cutting engagement with the sheet material to cut along the periphery of a pattern piece.

As seen most clearly in FIGS. 2 and 3, the cutting tool 14 is suspended from the Y carriage 18 by means of a support platform 62 which extends in cantilever fashion from an adjustable mount 64 on the projecting end of the Y carriage 18. The adjustable mount 64 is elevated or lowered with respect to the work surface of the table 12 by a motor (not shown) controlled by the computer so that the cutting tool 14 can be brought into cutting engagement with the sheet material S at the beginning of a cutting operation or raised out of contact with the sheet material at the end of a cutting operation. The cutting tool 14 includes a cutting wheel 70 having a sharp circumferential cutting edge which cuts the sheet material S when the tool is urged downwardly into engagement with the material by a detrusive force from the support platform 62. For cutting relatively hard materials such as the boron tapes, a carbide cutting wheel such as used for cutting glass has proven to be desirable and sufficiently wear resistant to provide a useful cutting life. The cutting wheel 70 is supported by a tool holder 72 in a quick-release chuck 74 so that the wheel rotates freely in the holder 72 about an axis 76 parallel with the work surface of the table 12 as the wheel is rolled over the work surface by the carriages 16 and 18 in cutting engagement with the sheet material. The quick-release chuck 74 contains a bore which receives the holder 72 in close fitting contact and a lock pin 78 retains the wheel 70 and holder 72 within the chuck 74.

The wheel 70 and chuck 74 are translated with the platform 62 in part by means of a journaled supporting shaft 80 which provides angular rotation of the tool about the $\theta$ axis 82 perpendicular to the work surface of the table 12. A rotational drive motor 84 is connected to the shaft 80 by means of a toothed belt 86 extending between motor pulley 88 and a large shaft pulley 90 secured to the upper end of the shaft 80. Rotation commands are derived from the memory tape 22 by the computer 20 and are applied to the drive motor 84 to control the angular position of the cutting wheel so that it translates tangentially along the periphery of the pattern piece at each point on the periphery.

In accordance with the present invention, a load control mechanism is interposed between the cutting tool 14 and the tool carriage 18 from which it is supported for regulating the detrusive force with which the cutting tool is urged along the $\theta$ axis 82 into cutting engagement with the sheet material S on the work surface. The load control mechanism, generally designated 100, includes an hydraulic load cylinder assembly 102 which is fixedly mounted on a small bridge 104 connected to the support platform 62. The load cylinder assembly 102 includes a piston rod 106 which extends coaxially through the central bore in the shaft 80 and connects through a thrust bearing 110 with the tool chuck 74. The chuck 74 is secured rotatively to splines on the depending end of the shaft 80 by a collar 112 so that the chuck and the tool 14 rotate with the shaft and slide axially along the shaft relative to the support platform 62. The thrust bearing 110 permits the chuck 74 to rotate the cutting wheel 70 about the $\theta$ axis 82 while the detrusive force is applied by the piston rod 106 to the cutting wheel.

The load applied to the cutting tool 70 and hence the detrusive force with which the cutting wheel is thrusted into the sheet material S is determined by the hydraulic pressure applied to the load control cylinder assembly 102 through the hydraulic lines 114 and 116. After a cutting operation, the hydraulic pressure in the lines 114 and 116 is reduced to zero and the tool 14 is lifted from the cutting table by the platform 62 and the adjustable mount 64 when the lifting ring 120 fixed to the lower end of the shaft 80 makes contact with the collar 112.

Figure 4:
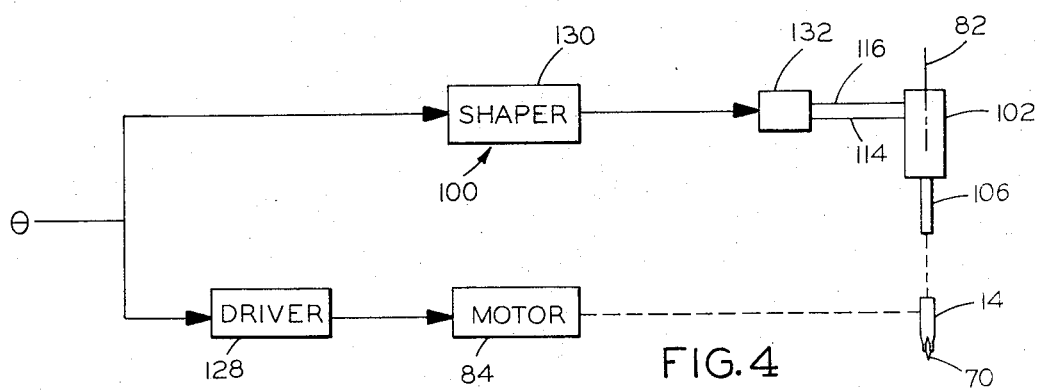
FIG. 4 is a schematic diagram of the apparatus utilized to control the detrusion forces applied to the cutting tool.

FIG. 4 is a schematic diagram showing the controls for the load control mechanism 100 and the rotational drive motor 84. The $\theta$ command signal from the computer 20 is applied to a motor driver 128 which controls the output position of the drive motor 84 and the angular position of the cutting wheel 70 about the $\theta$ axis 82. The motor positions the wheel 70 so that the tool remains tangent to or aligned with the cutting path through the sheet material on the cutting table. The $\theta$ command signal is also applied to a signal shaper 130 which produces a dc pressure signal that operates a pressure modulating hydraulic valve 132. The hydraulic valve is connected to a hydraulic pump (not shown) and regulates the hydraulic pressure applied through lines 114 and 116 to the load control cylinder assembly 102; therefore, the detrusive force applied by the piston rod 108 to the tool 14 varies with the $\theta$ command and the direction of the line of cut through the sheet material on the work surface.

Figures 5, 6:
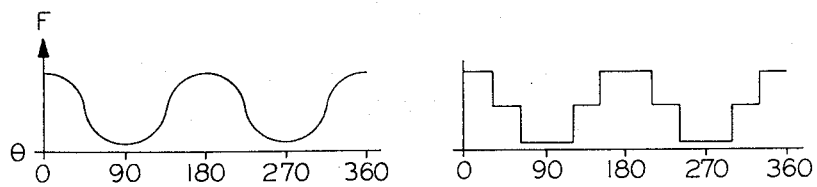
FIG. 5 is a plot showing the operating characteristics of the load control mechanism in one embodiment of the invention.
FIG. 6 is a plot showing the operating characteristics of the load control mechanism in another embodiment of the invention.

It will be readily understood that with fibrous composite materials such as boron fiber tape, the pressure signal produced by the signal shaper 130 should vary cyclically with every 180° change in the direction of the line of cut. FIG. 5 is a plot or schedule showing the input/outout characteristic of the shaper 130 in one embodiment of the invention. The pressure control signal of the shaper determined from the plot regulates the pressure outputs of the hydraulic valve in a proportional relationship and, therefore, the force applied to the tool 14 varies continuously with the direction of the cutting path. The plot indicates that the maximum force occurs when $\theta$ is equal to ($n \times 180°$) where $n$ is an integer and that the minimum force appears when $\theta$ is equal to ($n \times 180°$) $\pm$ 90°. Assuming that when $\theta$ is equal to 0°, the cutting tool is translated along the X axis of the cutting table 12, in other words that the X axis corresponds with $\theta$ commands equal to 0°, 180°, 360° etc., a boron fiber tape should be positioned on the cutting table with the fibers arranged parallel to the Y axis. With the shaper 130 having the characteristic indicated in FIG. 5, the maximum detrusive force is applied to the cutting wheel 70 as the wheel moves perpendicularly across the fibers and a minimum force is applied when the cutting tool is moving parallel with the fibers and meeting only the resistance of the relatively weak backing material. Such modulation of the detrusive forces would permit the cutting tool to be pressed tightly against the fibers as they are crossed in the transverse direction in spite of any inherent resiliency in the tool mount and the supporting surface of the table bed 34 but would limit the detrusive force when the cutting tool met the rather weak resistance of the backing material while being translated parallel to the fibers. An intermediate detrusive force is produced when the cutting tool traverses lines of cut running at angles intermediate the principal directions or axes of the boron tape.

FIG. 6 discloses the input/output characteristics of the shaper 130 in another embodiment of the invention. In this embodiment, the detrusive forces vary in a discontinuous or stepwise manner, the maximum forces being produced along lines of cut which are close to the X axis, minimum forces being generated for lines of cut close to the Y axis and intermediate forces being produced for lines of cut which are approximately 45° to the principal axes.

While the present invention has been described in several preferred embodiments, it should be understood that numerous modifications and substitutions can be had without departing from the spirit of the invention. Although the apparatus and the method by which the apparatus operates has been disclosed with respect to a cutting operation for boron filament tapes, ij can be applied with equally satisfactory results to other cutting operations in which an anisotropic material is cut. The particular cutting tool disclosed is a cutting wheel that produces a relatively constant reaction force on the support platform 62 as it traverses a given direction through a sheet material; however, since a reciprocating type cutting tool also requires a greater detrusive force as it moves transversely across a fibrous composite, the principles of the present invention are also applicable to systems reciprocating cutting tools. Accordingly, the present invention has been described in several preferred embodiments by way of illustration rather than limitation.

We claim:

1. Apparatus for cutting pattern pieces from sheet material comprising: support means providing a work surface for holding the sheet material fixedly in a spread condition; a cutting tool; carriage means interposed between the support means and the cutting tool for moving the tool and the support means relative to one another with the tool held in cutting engagement with the sheet material on the work surface; movement control means connected to the carriage means for controlling the relative movement of the cutting tool and the support means to cause the cutting tool to translate along a cutting path at the periphery of a pattern piece to be cut from the sheet material; load generating means connected with the carriage means and the cutting tool for applying a detrusion force to hold the cutting tool in cutting engagement with the sheet material; and load control means connected to the load generating means to regulate in a controlled manner the generating means and thereby produce a variable detrusion force between the tool and sheet material as the tool translates along the periphery of the pattern piece.

2. Apparatus for cutting as defined in claim 1 wherein the load control means is connected to and responsive to the movement control means for regulating the generating means and the variable detrusion force between the cutting tool and the sheet material.

3. Apparatus for cutting as defined in claim 2 wherein the load control means is connected to and responsive to the portion of the movement control means controlling the direction of cut in the sheet material to regulate the detrusion force on the cutting tool as a function of the cutting direction.

4. Apparatus for cutting as defined in claim 1 wherein: the carriage means is mounted for translation parallel to the work surface of the support means and includes a tool mount rotatable about an axis perpendicular to the work surface and a drive motor connected in driving relationship to the mount and responsive to rotational commands from the movement control means for rotational positioning of the mount about the perpendicular axis; the cutting tool comprises a cutting wheel supported in the tool mount for rolling movement about an axis parallel to the work surface; and the load control means connected to the generating means is responsive to the rotational commands from the movement control means for regulating the force holding the cutting wheel in engagement with the sheet material.

5. Apparatus for cutting as defined in claim 4 wherein the cutting wheel is a carbide wheel having a sharp circumferential cutting edge.

6. Apparatus as defined in claim 4 for cutting sheet material wherein the movement control means provides rotational commands to the drive motor maintaining the cutting wheel substantially tangent to the cutting path over the sheet material.

7. Apparatus as defined in claim 6 wherein the load generating means includes a control load cylinder assembly connected to the cutting wheel to provide a detrusion force to the wheel and the load control means includes a signal shaper connected to the cylinder assembly ahd providing a maximum detruding force from the assembly for rotational commands associated with a first direction and a minimum detruding force for rotational commands associated with a second direction oriented 90° to the first direction.

8. Apparatus for cutting articles from an anisotropic sheet material having different cutting characteristics along different principal directions comprising: a work table defining a support surface for supporting the anisotropic sheet material in a spread condition; a tool carriage movable relative to the support surface of the work table in a direction parallel to the work surface; a cutting tool and a cutting tool holder mounted to the tool carriage and rotatable relative to the carriage about an axis normal to the work surface; control means connected to the tool carriage for controlling the movement of the tool and the tool holder parallel to the support surface and rotationally about the normal axis to guide the cutting tool tangentially along a cutting path through the anisotropic sheet material; and loading means connecting with the tool holder for urging the cutting tool toward the support surface with a force varying with the direction of movement of the cutting tool through the anisotropic sheet material spread on the support surface.

9. Apparatus for cutting articles as defined in claim 8 wherein the work table includes a bed having an exposed resilient surface defining the support surface of the table.

10. Apparatus for cutting articles as defined in claim 9 wherein the work table is a vacuum table having means for generating a subatmospheric pressure adjacent the support surface.

11. Apparatus for cutting as defined in claim 8 wherein the cutting tool comprises a wheel having a sharpened peripheral cutting edge and the wheel is supported in the tool holder about an axis parallel with the support surface for rotation relative to the holder.

12. Apparatus for cutting as defined in claim 8 wherein the control means includes a programmed memory and a computer generating translational and directional command signals for the tool and tool carriage from information stored in the programmed memory; and the loading means is connected to the control means and is responsive to the directional command signals for varying the force urging the tool toward the support surface.

13. Apparatus for cutting as defined in claim 12 wherein the loading means includes a load cylinder assembly and shaping means receiving the directional command signals and producing stepwise varying load signals as a function of the command signals; the load cylinder being connected to and controlled by the shaping means to urge the cutting tool toward the support surface with stepwise varying forces.

14. Apparatus for cutting as defined in claim 12 wherein the loading means includes a loading cylinder and shaping means receiving the directional command signals and producing load signals varying continuously as a function of the command signals; the load cylinder being connected to and controlled by the shaping means to urge the cutting tool toward the support surface with continuously varying forces.

15. A method for cutting pattern pieces from a sheet material comprising: spreading the sheet material on a supporting surface; guiding a cutting tool over the supporting surface to cause a cutting edge of the tool to follow in cutting engagement the periphery of a pattern piece to be cut from the material; and urging the cutting tool toward the sheet material on the supporting surface as the material is cut with a force varying with the direction of the cut over the material at each point along the periphery of the pattern piece.

16. A method for cutting pattern pieces as defined in claim 15 including the step of providing a cutting tool in the form of a rotatable wheel having a sharp circumferential cutting edge; and wherein the step of guiding comprises moving the wheel along the periphery of the pattern piece and maintaining the cutting wheel oriented generally tangent to or aligned with the direction of the cut at each point along the periphery of the pattern piece.

17. A method for cutting as defined in claim 16 wherein the step of urging comprises establishing a schedule of cutting forces for the various directions of cut through the sheet material; determining the direction of cut at each point along the periphery of the pattern piece; and applying a force to the cutting wheel at each point along the periphery in accordance with the direction of cut and the schedule of forces.

18. A method as defined in claim 17 wherein the step of establishing comprises establishing a schedule of stepwise varying cutting forces for the various directions of cut.

19. A method as defined in claim 17 wherein the step of establishing comprises establishing a schedule of forces varying continuously with the various directions of cut.

20. A method of cutting an anisotropic sheet material having different cutting resistances along different coordinate axes on a work surface of a cutting table comprising: positioning the anisotropic sheet material on the work surface of the table in a spread condition; orienting the sheet material on the work surface with respect to a given reference direction on the work surface in accordance with the anisotropic characteristics of the sheet material; moving a cutting tool relative to the work surface of the table in cutting engagement with the sheet material to traverse a desired line of cut; and forcing the cutting tool into engagement with the sheet material at each point on the line of cut with a force varying as a function of the direction of the line of cut.

21. A method of cutting an anisotropic sheet material as defined in claim 20 wherein the step of forcing comprises forcing the tool into cutting engagement with the sheet material with a force varying cyclically with every 180° change in direction of the line of cut.

22. A method of cutting an anisotropic sheet material as defined in claim 21 wherein the step of moving comprises rolling a cutting wheel over the work surface of the table in cutting engagement with the sheet material and maintaining the wheel tangent to the line of cut.

23. Apparatus for cutting a sheet material composed in part of a filamentary layer formed by a plurality of closely packed and parallel fibers comprising: a work table having a work surface on which the sheet material is positioned in a spread condition for a cutting operation; a tool carriage for carrying a cutting tool; controlled motor means for moving the tool carriage and the work table relative to one another parallel to the work surface of the table and along a controlled path; a cutting tool comprised of a cutting wheel mounted freely rotatable about an axis parallel to the work surface; mounting means connecting the tool with the tool carriage and including a tool holder controllably rotatable about an axis perpendicular to the work surface for orienting the cutting wheel relative to the direction of cut; rotary drive means for positioning the tool holder and the cutting wheel rotationally about the axis normal to the work surface as the tool carriage and the work table move relative to one another; and means for urging the cutting wheel into cutting engagement with the sheet material on the work surface with a force varying as a function of the angle between the fibers and the orientation of the cutting wheel.

24. Apparatus for cutting as defined in claim 23 wherein the mounting means includes an adjustable platform movably mounted on the tool carriage for adjustment relative to the carriage toward and away from the work surface of the work table and wherein the cutting wheel and tool holder are suspended from the adjustable platform over the work surface of the table.

25. Apparatus for cutting as defined in claim 23 wherein the cutting wheel is a carbide cutting wheel.

* * * * *